(12) United States Patent
Elhage et al.

(10) Patent No.: US 9,149,145 B2
(45) Date of Patent: Oct. 6, 2015

(54) FOOD DISPENSER

(71) Applicants: John Elhage, Rockdale (AU); George Elhage, Rockdale (AU); Steve Astifo, Villawood (AU)

(72) Inventors: John Elhage, Rockdale (AU); George Elhage, Rockdale (AU); Steve Astifo, Villawood (AU)

( * ) Notice: Subject to any disclaimer, the term of this patent is extended or adjusted under 35 U.S.C. 154(b) by 8 days.

(21) Appl. No.: 13/896,377

(22) Filed: May 17, 2013

(65) Prior Publication Data

US 2014/0175132 A1    Jun. 26, 2014

(30) Foreign Application Priority Data

Dec. 20, 2012   (AU) ................................ 2012268820
Feb. 23, 2013   (GB) .................................. 1303222.2

(51) Int. Cl.
*A47J 9/00*          (2006.01)

(52) U.S. Cl.
CPC ........................................ *A47J 9/001* (2013.01)

(58) Field of Classification Search
CPC ..... A45D 40/04; A45D 2040/208; A47J 9/00; A47J 47/01; A47J 2009/001; B65D 83/0005; B65D 83/0011
USPC .......... 222/390; 221/239, 251, 279, 294, 310; 401/68, 75, 87
See application file for complete search history.

(56) References Cited

U.S. PATENT DOCUMENTS

| | | | | |
|---|---|---|---|---|
| 1,943,587 | A | * | 1/1934 | Davis ............................ 426/132 |
| 3,162,884 | A | * | 12/1964 | Bordwine et al. .............. 401/12 |
| 3,251,188 | A | * | 5/1966 | Dean et al. ........................ 62/3.6 |
| 3,630,349 | A | * | 12/1971 | Rechberger ................... 206/372 |
| 3,708,946 | A | * | 1/1973 | Cahill ............................. 53/472 |
| 3,907,441 | A | * | 9/1975 | Idec et al. ....................... 401/75 |
| 3,942,683 | A | * | 3/1976 | Haas .............................. 221/229 |
| 4,500,145 | A | * | 2/1985 | Fassauer ......................... 312/61 |
| 4,544,083 | A | * | 10/1985 | Schroeder ....................... 222/47 |
| D315,083 | S | * | 3/1991 | Anderson et al. ............. D7/670 |
| 5,421,663 | A | * | 6/1995 | Bravo .............................. 401/82 |
| 6,820,776 | B2 | * | 11/2004 | Hemming et al. ............ 222/390 |
| 2007/0000946 | A1 | | 1/2007 | Phipps et al. |

OTHER PUBLICATIONS

Search and Examination Report for foreign equivalent GB 1303222.2.

* cited by examiner

*Primary Examiner* — Kevin P Shaver
*Assistant Examiner* — Nicholas J Weiss
(74) *Attorney, Agent, or Firm* — Simana Rao, Esq.; William Hare, Esq.; McNeely, Hare & War, LLP

(57) ABSTRACT

A food product dispensing device (10) includes a housing (12) with an opening (66). The device includes a drive screw (30) for driving a piston (42) towards the opening. Portions (76) of a food product are placed in the housing and are forced through the opening by the piston as the screw is rotated. There are separators (78) between each two adjacent portions. These allow one portion at a time to be ejected through the opening and used or consumed, for example by spreading.

18 Claims, 2 Drawing Sheets

FOOD DISPENSER

CROSS-REFERENCE TO RELATED APPLICATIONS

This application claims priority under 35 USC §119(a) to Australian Application No. 2012268820 filed on Dec. 20, 2012 and United Kingdom Application No. GB 1303222.2, both applications being incorporated herein in their entirety by reference.

FIELD OF THE INVENTION

This invention relates to a food dispensing device. More specifically, this invention relates to a device for dispensing discrete portions of food product, and to a method of dispensing such portions.

BACKGROUND TO THE INVENTION

A traditional method of applying hard spreadable food substances such as butter on bread, corn, or even when greasing a dish for cooking purposes, is by means of a knife, spatula or similar implement. Typically, the implement is used to scrape a portion of the product from a container such as a butter container, before it is applied as needed.

When applying such a spreadable product, for example, to bread or toast, a commonly experienced problem is that, because of the hardness of the spreadable product, and the nature of implement used, the bread or toast tears. In addition, in such uses, and also, for example when applying such products such as butter to a dish, there is often difficulty in spreading the product evenly.

There are known dispenser devices for dispensing and spreading such products, which involve injecting a portion of the spreadable product from a container, to enable the rubbing of the product and hence spreading thereof onto a surface such as bread. However, it is often difficult to gauge how much of the product is applied. More significantly, applying such spreadable food products to other foods can often result in contamination of that portion of the food product remaining in the dispenser.

It is an object of the present invention to overcome or ameliorate disadvantages of the prior art, or to provide a useful alternative thereto.

SUMMARY OF THE INVENTION

In a preferred embodiment, there is provided a food product dispensing device including:
 a housing defining a dispensing opening;
 a piston in the housing, the piston being movable from a first position spaced a first distance from the dispensing opening to a second position spaced a second distance from the dispensing opening, the second distance being less than the first distance;
 a plurality of discrete spreadable food item portions disposed in a series arrangement within the housing between the piston and the dispensing opening; and
 an actuator attached to the housing and adapted to drive the piston from the first position to the second position thereby to drive said portions sequentially through the dispensing opening.

In a preferred embodiment, each adjacent pair of portions are separated from each other by a portion separator.

Preferably, the device includes a separator retainer for releasably retaining the or each separator as the portion immediately ahead of the separator towards the dispensing opening is forced through the opening.

The separator retainer preferably includes a catch for engaging a said separator as the separator reaches the dispensing opening under driving force of the piston.

Preferably, the catch is flexible and is adapted to retain the separator when a first driving force is applied by the piston to the separator, and to flexibly give way to the separator thus allowing ejection of the separator from the housing, when a second driving force, greater than the first driving force, is applied by the piston to the separator.

In a preferred embodiment, the actuator includes an elongate drive screw extending within and longitudinally with respect to the housing, the drive screw having an external screw thread, and the piston has a central aperture through which the drive screw extends and a complementary screw thread in the aperture in engagement with the external screw thread, such that rotation of the drive screw relative to the piston causes the piston to ride along the drive screw from the first position towards the second position.

In a preferred embodiment, the device includes a ridge extending longitudinally along an inner surface of the housing, wherein the piston includes a piston notch shaped complementarily with respect to a cross-sectional shape of the ridge and adapted to slide along the ridge as the piston moves from the first position towards the second position, thus preventing rotation of the piston during rotation of the drive screw.

In a preferred embodiment, the catch is integral with the ridge.

Preferably, the or each separator defines a separator notch shaped complementarily with respect to a cross-sectional shape of the ridge and adapted to slide along the ridge as the piston moves from the first position towards the second position, wherein the catch includes a catch face which extends beyond an inner edge of the separator notch thereby to effect said releasable retaining of the separator.

In a preferred embodiment, the actuator includes a rotatable actuator knob attached to the drive screw, the knob being adapted, on rotation, to rotate the drive screw.

According to a second aspect of the invention, there is provided a method of dispensing a food product portion using a device according to the first aspect of the invention, the method including:
 actuating the actuator thereby driving the piston from the first position towards the second position thereby driving a said portion through the dispensing opening; and
 spreading that portion with the device.

According to a third aspect of the invention, there is provided a method of dispensing a food product portion using a device according preferred embodiments of the first aspect of the invention, the method including:
 actuating the actuator thereby driving the piston from the first position towards the second position thereby driving a said portion through the dispensing opening until the separator retainer releasably retains a separator immediately behind that portion; and
 spreading that portion with the device.

BRIEF DESCRIPTION OF THE DRAWINGS

Preferred embodiments of the invention will now be described, by way of example only, with reference to the accompanying drawings in which.

DETAILED DESCRIPTION

Figure 1:
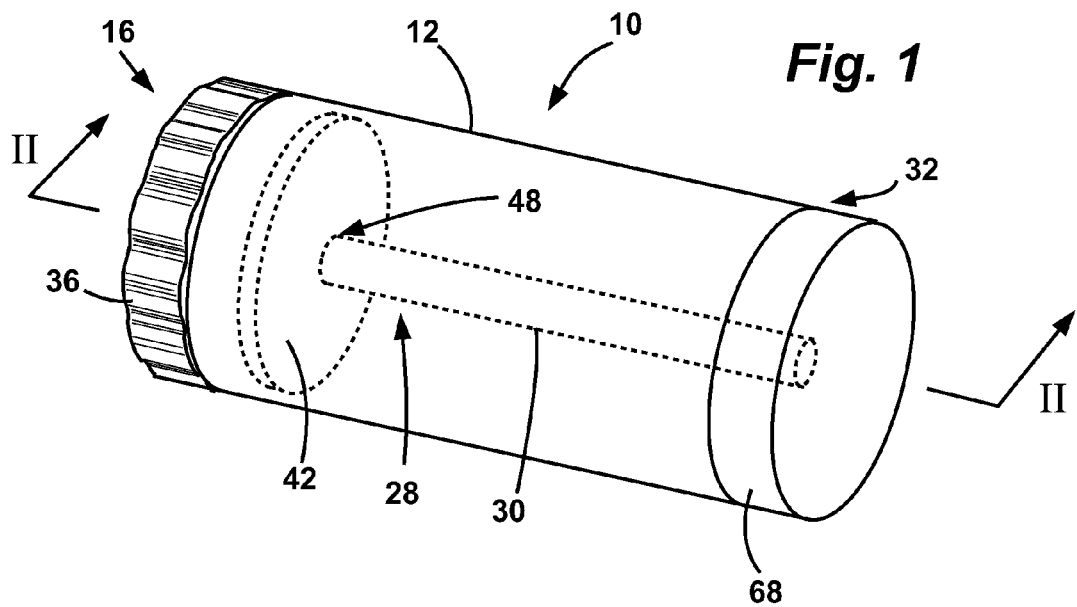
FIG. 1 is a schematic perspective view of a food product dispensing device according to an embodiment of the invention.

Referring to the drawings, there is shown a food product dispensing device 10. The device 10 includes a cylindrical housing 12 which is of transparent plastics material.

Towards a rear end 16 of the device 10, the housing 12 includes an annular wall 18 with an aperture 20 in the centre thereof. Extending from the aperture 20, inwardly with respect to the interior 22 of the housing 12 are a number of tabs 24, which converge, in a direction away from the annular wall 18, towards a central axis 26 of the housing.

Figure 2:
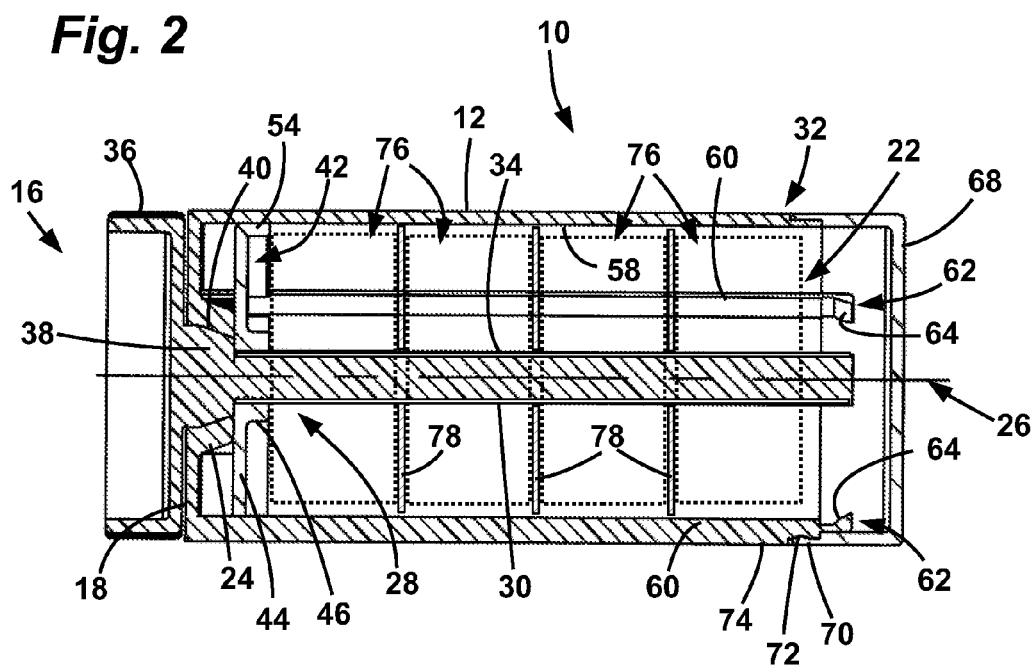
FIG. 2 is a cross-section through the device of FIG. 1, when along the lines II-II.
Figure 3:
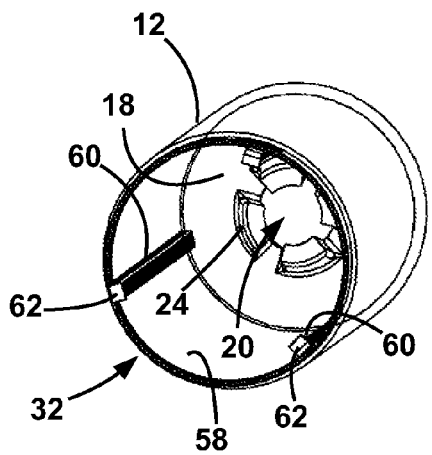
FIG. 3 is a perspective view of a housing forming part of the device of FIG. 1.
Figure 4:
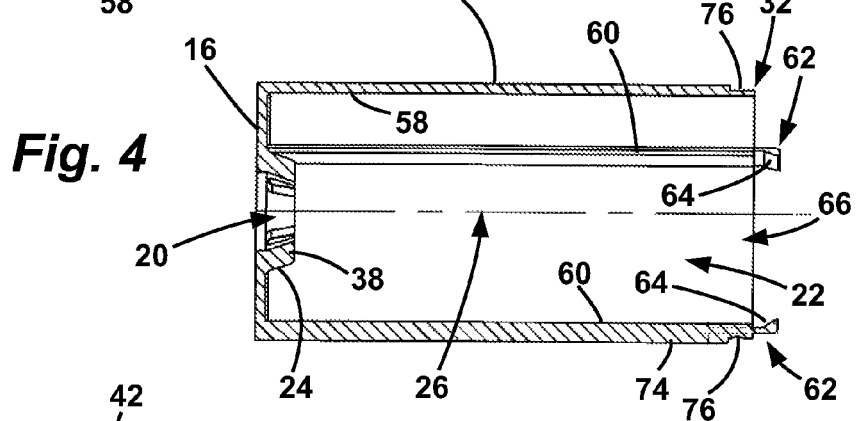
FIG. 4 is a cross-section through the housing of FIG. 3, along the lines II-II in FIG. 1.

An actuator 28 is provided, which includes a drive screw 30 which extends through the aperture 20, and between the tabs 24, in a direction from the annular wall 18, towards an opposite, front end 32 of the housing 12. The drive screw 30 has an external screw thread at 34 as indicated in FIG. 2.

The actuator 28 is also provided with an actuator knob 36 which is integrally joined to the drive screw 30.

The actuator 28 further includes a frusto-conical protrusion 38 which has an outer wall 40 which is tapered so as to be complementary to the tabs 24. The protrusion 38 includes an interlocking portion (not shown) which is configured to snap engage with the tabs 24 when the device 10 is first assembled and the drive screw 30 is inserted through the aperture 20. Once the protrusion 38 is engaged with the tabs 24 in this manner, the actuator 28 is effectively locked in its longitudinal position with respect to the housing 12, although it is still rotatable relative to the housing.

Figure 5:
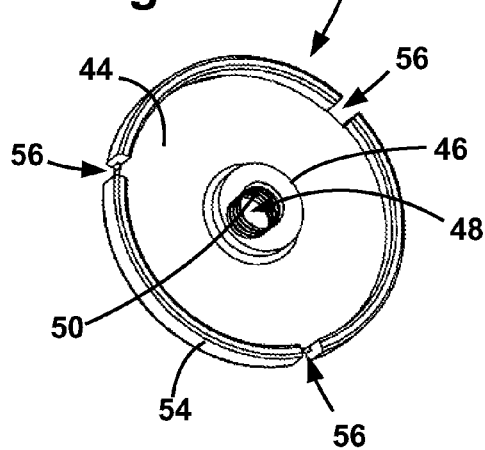
FIG. 5 is a perspective view of a piston forming part of the device of FIG. 1, viewed from an inner side of thereof.
Figure 6:
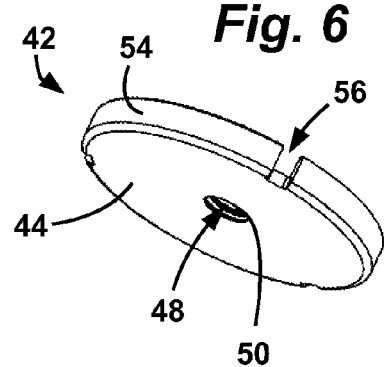
FIG. 6 is a perspective view of the piston of FIG. 5, viewed from an outer side thereof.

A piston 42 is provided, which is substantially circular in shape. As best seen in FIG. 5, the piston 42 has a base wall 44 and a boss 46 protruding from the base wall. An aperture 48 is provided, which opens through the centre of the base wall 44 and boss 46.

The aperture 48 is provided with an internal screw thread 50 which is complementary to the external screw thread 34 on the drive screw 30. The piston 42 is disposed on the drive screw 30, such that the drive screw passes through the aperture 48 as shown in FIGS. 1 and 2, with the external screw thread 34 of the drive screw being engaged with the internal screw thread 50 of the aperture. Thus, the drive screw 30 is rotatable relative to the piston 42.

The piston 42 is further provided with an outer rim 54, and three notches 56 in the rim.

The housing 12, on an inner surface 58 thereof, is provided with three ridges 60, which extend parallel to the axis 26, along the length of that inner surface.

The cross-sectional shape of the ridges 60, when viewed along their lengths, is complementary to the shapes of the notches 56 in the piston 42. Thus, each notch 56 has a respective ridge 60 extending through it, as best seen in FIG. 2.

Protruding from the end of each ridge 60 beyond the front end 32 of the housing 12, are resiliently deformable separator retainer catches 62, each having a catch face 64, the catch faces converging towards the axis 26 in a direction away from the rear end 16 of the device 10.

The inner surface 58 of the housing 12 its front end 32, defines a dispensing opening 66 into the interior 22.

A removable cap 68 is provided, which has an outer skirt 70 which is adapted to be engaged as a snap-fit with a recessed portion 72 in the outer surface 74 of the housing 12. Thus, the cap 68 can be secured to the housing 12 so as to close the dispensing opening 66, and can also be removed to open that opening.

The device 10 can be used to dispense a hard, spreadable food product such as butter, hard peanut butter, yeast spread, chocolate, etc. In particular, the food product is provided in portions 76, a number of which are shown in FIG. 2 in dotted lines. The portion 76 closest to the piston 42 is in contact with the piston, and has an outer diameter such that the portion is within the bounds of the rim 54 in the piston. The remaining portions 76 have similar diameters so that they are slightly spaced from the inner surface 58 of the housing 12.

Figure 7:
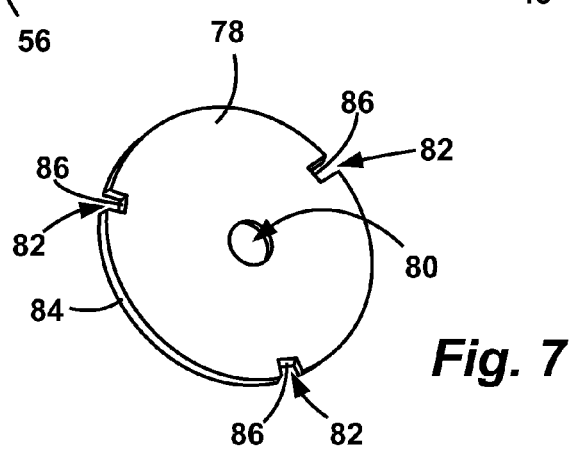
FIG. 7 is a perspective view of a portion separator forming part of the device of FIG. 1.

Between each pair of adjacent portions 76 of food product, there is provided a respective portion separator 78 (see FIGS. 2 and 7). Each portion separator 78 is essentially in the form of a disc having a central aperture 80 and three notches 82 in the outer edge 84 of the separator. The drive screw 30 extends through the apertures 80 of the portion separators 78.

The aperture 80 of each separator 78 is somewhat larger in diameter than the outer diameter of the external screw thread 34 of the drive screw 30, while each notch 82, as in the case of the notches 56 in the piston 42, is shaped so as to be complementary to the cross-sectional shape of a respective ridge 60 when the ridge is viewed along its length. Thus, each notch 82 of each separator 78 has a respective ridge 60 extending through it. As the diameters of the apertures 80 are greater than the outer diameter of the external screw thread 34 of the drive screw 30, each separator 78 is a free to slide along the drive screw.

The catch faces 64 of the separator retainer catches 62 converge towards the axis 26 such that the inner extremities of the catch faces relative to the axis are disposed closer to the axis than radially inner edges 86 of the notches 82 of each separator 78. It will be recalled that the ridges 60 extend through those notches 82.

In order to use the device 10, it is preloaded with the portions 76 of the food product, separated by separators 78, as shown in FIG. 2.

The cap 68 is removed from the housing 12 thereby exposing the opening 66. The knob 36 can then be rotated about the axis 26, thereby also rotating the drive screw 30 which is integrally joined to the knob.

As the drive screw 30 rotates, the engagement of its external screw thread 34 with the internal screw thread 50 of the piston 42 causes the piston to be driven in a direction from the rear end 16 of the device 10 towards the front end 32 of the housing 12.

As the piston 42 is driven in this manner, this forces the portions 76 of food product towards the opening 66, such that the portion closest to the opening emerges from the opening.

As the knob 36 is continued to be rotated in this manner, the separator 78 immediately rearward (downstream) of that particular closest portion 76 of food product will reach the retainer catches 62. As the catch faces 64 of the retainer catches 62 engage with the inner edges 86 of the notches 82 in the relevant separator 78, the retainer catches serve to restrain the separator 78 and thus provide increased resistance to rotation of the knob 36.

It will be appreciated that when this occurs, the front-most portion of 76 of food product will be protruding from the opening 66. In this position, the portion 76 of food product can be spread as desired, for example on a piece of bread or toast, on corn on the cob, on a dish or other surface, and so on.

When that portion 76 has been used, the portion separator 78 that was immediately rearward of that portion will essentially be exposed adjacent to the opening 66.

The separator retainer catches 62 are flexible, and therefore, if increased rotational force is applied to the knob 36, this forces the piston 42, and hence that leading separator 76, through the opening 66.

The catch faces 64 of the retainer catches 62, because of their tapered orientation with respect to the axis of 26, will be forced to ride over the inner edges 86 of the notches 82 in the relevant separator 78, thereby causing the catches to be deformed radially outwardly with respect to the axis 26, thereby allowing the separator to be ejected from the housing 12. It will be appreciated that as soon as that separator 78 moves clear of the retainer catches 62, the retainer catches, due to their resilience, will snap back to their normal positions.

Once the leading separator 78 has been ejected in this manner, the leading face of the next portion 76 of food product will be exposed. As that portion will not have come into contact with the food or other surface on which the previous portion had been spread, it will remain uncontaminated by that spreading.

The cap 68 can then be replaced on the housing 12 to assist in retaining the freshness of the next portion 76 of food product, and other portions within the housing 12.

Apart from the convenience that the device 10 can provide, it can also be environmentally friendly in that it often does not require washing or dishwashing after use.

Although the invention is described above in relation to preferred embodiments, it will be appreciated by those skilled in the art that it is not limited to those embodiments, but may be embodied in many other forms.

For example, instead of the separators 78 being capable of being ejected due to deformation of the retainer catches 62 as discussed above, this may be enabled by the separators themselves being resiliently deformable and deflecting as they move past the retainer catches.

The invention claimed is:

1. A food product dispensing device including:
a housing defining a dispensing opening;
a piston in the housing, the piston being movable from a first position spaced a first distance from the dispensing opening to a second position spaced a second distance from the dispensing opening, the second distance being less than the first distance;
a plurality of discrete spreadable food item portions disposed in a series arrangement within the housing between the piston and the dispensing opening, wherein each adjacent pair of portions are separated from each other by a portion separator; and
an actuator attached to the housing and adapted to drive the piston from the first position to the second position thereby to drive said portions sequentially through the dispensing opening.

2. A dispensing device according to claim 1, including a separator retainer for releasably retaining the or each separator as the portion immediately ahead of the separator towards the dispensing opening is forced through the opening.

3. A dispensing device according to claim 2, wherein the separator retainer includes a catch for engaging a said separator as the separator reaches the dispensing opening under driving force of the piston.

4. A dispensing device according to claim 3, wherein the catch is flexible and is adapted to retain the separator when a first driving force is applied by the piston to the separator, and to flexibly give way to the separator thus allowing ejection of the separator from the housing, when a second driving force, greater than the first driving force, is applied by the piston to the separator.

5. A dispensing device according to claim 1 wherein the actuator includes an elongate drive screw extending within and longitudinally with respect to the housing, the drive screw having an external screw thread, and the piston has a central aperture through which the drive screw extends and a complementary screw thread in the aperture in engagement with the external screw thread, such that rotation of the drive screw relative to the piston causes the piston to ride along the drive screw from the first position towards the second position.

6. A dispensing device according to claim 5 including a ridge extending longitudinally along an inner surface of the housing, wherein the piston includes a piston notch shaped complementarily with respect to a crosssectional shape of the ridge and adapted to slide along the ridge as the piston moves from the first position towards the second position, thus preventing rotation of the piston during rotation of the drive screw.

7. A dispensing device according to claim 3 wherein the actuator includes an elongate drive screw extending within and longitudinally with respect to the housing, the drive screw having an external screw thread, and the piston has a central aperture through which the drive screw extends and a complementary screw thread in the aperture in engagement with the external screw thread, such that rotation of the drive screw relative to the piston causes the piston to ride along the drive screw from the first position towards the second position.

8. A dispensing device according to claim 7 including a ridge extending longitudinally along an inner surface of the housing, wherein the piston includes a piston notch shaped complementarily with respect to a crosssectional shape of the ridge and adapted to slide along the ridge as the piston moves from the first position towards the second position, thus preventing rotation of the piston during rotation of the drive screw.

9. A dispensing device according to claim 8 wherein the catch is integral with the ridge.

10. A dispensing device according to claim 8 wherein the or each separator defines a separator notch shaped complementarily with respect to a cross-sectional shape of the ridge and adapted to slide along the ridge as the piston moves from the first position towards the second position, wherein the catch includes a catch face which extends beyond an inner edge of the separator notch thereby to effect said releasable retaining of the separator.

11. A dispensing device according to claim 5 wherein the actuator includes a rotatable actuator knob attached to the drive screw, the knob being adapted, on rotation, to rotate the drive screw.

12. A method of dispensing a food product portion using a device according to claim 1, the method including:
actuating the actuator thereby driving the piston from the first position towards the second position thereby driving a said portion through the dispensing opening; and
spreading said portion with the device.

13. A method of dispensing a food product portion using a device according to claim 2, the method including:
actuating the actuator thereby driving the piston from the first position towards the second position thereby driving a said portion through the dispensing opening until the separator retainer releasably retains the separator immediately behind said portion; and spreading said portion with the device.

14. A dispensing device according to claim 2 wherein the actuator includes an elongate drive screw extending within and longitudinally with respect to the housing, the drive screw having an external screw thread, and the piston has a central aperture through which the drive screw extends and a complementary screw thread in the aperture in engagement with the external screw thread, such that rotation of the drive screw relative to the piston causes the piston to ride along the drive screw from the first position towards the second position.

15. A dispensing device according to claim 4 wherein the actuator includes an elongate drive screw extending within and longitudinally with respect to the housing, the drive screw having an external screw thread, and the piston has a central aperture through which the drive screw extends and a complementary screw thread in the aperture in engagement with the external screw thread, such that rotation of the drive screw relative to the piston causes the piston to ride along the drive screw from the first position towards the second position.

16. A dispensing device according to claim 9 wherein the or each separator defines a separator notch shaped complementarily with respect to a cross-sectional shape of the ridge and adapted to slide along the ridge as the piston moves from the first position towards the second position, wherein the catch includes a catch face which extends beyond an inner edge of the separator notch thereby to effect said releasable retaining of the separator.

17. A dispensing device according to claim 10 wherein the actuator includes a rotatable actuator knob attached to the drive screw, the knob being adapted, on rotation, to rotate the drive screw.

18. A method of dispensing a food product portion using a device according to claim 11, the method including:

actuating the actuator thereby driving the piston from the first position towards the second position thereby driving a said portion through the dispensing opening until the separator retainer releasably retains the separator immediately behind said portion; and spreading said portion with the device.

* * * * *